US012785748B2

(12) United States Patent
Ye et al.

(10) Patent No.: US 12,785,748 B2
(45) Date of Patent: Nov. 3, 2026

(54) METHOD AND DEVICE FOR LOCATING PASSIVE INTERMODULATION (PIM) SOURCE

(71) Applicant: Telefonaktiebolaget LM Ericsson (publ), Stockholm (SE)

(72) Inventors: Hao Ye, Beijing (CN); Jinsong Yang, Beijing (CN); Haiying Cao, Beijing (CN); Peng Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 18/706,406

(22) PCT Filed: Nov. 10, 2021

(86) PCT No.: PCT/CN2021/129761
§ 371 (c)(1),
(2) Date: May 1, 2024

(87) PCT Pub. No.: WO2023/082088
PCT Pub. Date: May 19, 2023

(65) Prior Publication Data
US 2026/0163603 A1 Jun. 11, 2026

(51) Int. Cl.
*H04B 1/525* (2015.01)
*H01Q 1/52* (2006.01)

(52) U.S. Cl.
CPC ............. *H04B 1/525* (2013.01); *H01Q 1/525* (2013.01)

(58) Field of Classification Search
CPC ................................ H04B 1/525; H01Q 1/525
See application file for complete search history.

(56) References Cited

U.S. PATENT DOCUMENTS

| | | | |
|---|---|---|---|
| 9,768,812 | B1 | 9/2017 | Tsui et al. |
| 2017/0149463 | A1 | 5/2017 | Kang et al. |
| 2017/0343660 | A1 | 11/2017 | Wang |
| 2018/0081047 | A1 | 3/2018 | Gander |
| 2020/0106534 | A1 | 4/2020 | Chen et al. |

(Continued)

FOREIGN PATENT DOCUMENTS

| | | | | |
|---|---|---|---|---|
| CN | 103516373 | A | 1/2014 | |
| GB | 2575115 | A * | 1/2020 | H04B 17/00 |
| GB | 2583065 | A * | 10/2020 | H04B 17/10 |

(Continued)

OTHER PUBLICATIONS

Author Unknown, "Effective PIM Testing Helps Ensure Network KPIs and Lower Operational Costs," Blog Post, Dec. 9, 2020, The PIM Source, 3 pages.

(Continued)

*Primary Examiner* — Nguyen T Vo
(74) *Attorney, Agent, or Firm* — Withrow & Terranova, PLLC

(57) ABSTRACT

The present disclosure is related to a method and a device for locating a PIM source in a link comprising multiple segments. The method comprises: determining one of the multiple segments, in which a PIM source is located, at least partially based on delay intervals that are configured or predetermined for the multiple segments and a PIM loopback delay of a PIM component that is related to the PIM source.

20 Claims, 10 Drawing Sheets

(56) References Cited

U.S. PATENT DOCUMENTS

2022/0069927 A1* 3/2022 Abdelmonem ........ H01Q 1/002

FOREIGN PATENT DOCUMENTS

| | | | |
|---|---|---|---|
| KR | 101361678 | B1 | 2/2014 |
| WO | 2020002954 | A1 | 1/2020 |

OTHER PUBLICATIONS

Author Unknown, "FirstNet Deployment Creates New PIM Challenges," Blog Post, Nov. 16, 2018, The PIM Source, 3 pages.

Author Unknown, "Using Distance-to-PIM (DTP) and Distance-to-Fault (DTF) trace overlay to speed site repair," Application Note, Revision A, Jun. 2015, Anritsu Company, 8 pages.

Kohli, Victor, "Rollout of 5G Creates PIM Issues for Contractors, Mobile Operators," Blog Post, Mar. 31, 2022, The PIM Source, 8 pages.

International Search Report and Written Opinion for International Patent Application No. PCT/CN2021/129761, mailed May 30, 2022, 9 pages.

Extended European Search Report for European Patent Application No. 21963545.5, mailed May 13, 2025, 6 pages.

* cited by examiner (a)

(b)

(c)

(d)

METHOD AND DEVICE FOR LOCATING PASSIVE INTERMODULATION (PIM) SOURCE

This application is a 35 U.S.C. § 371 national phase filing of International Application No. PCT/CN2021/129761, filed Nov. 10, 2021, the disclosure of which is incorporated herein by reference in its entirety.

TECHNICAL FIELD

The present disclosure is related to the field of telecommunication, and in particular, to a method and a device for locating a passive intermodulation (PIM) source.

BACKGROUND

With the development of the electronic and telecommunications technologies, mobile devices, such as mobile phones, smart phones, laptops, tablets, vehicle mounted devices, become an important part of our daily lives. To support a numerous number of mobile devices, a highly efficient Radio Access Network (RAN), such as a fifth generation (5G) New Radio (NR) RAN, will be required.

PIM is an unpleasant side effect of successful RAN deployments, and is a problem that is growing in impact as complexity increases with the deployment of 4G and 5G RANs. PIM has the potential to degrade the efficiency of a cell site, and this network degradation directly impacts the edge of cell performance and/or the throughput of the cell site, for example.

PIM is a form of intermodulation distortion that occurs in components that are normally thought of as linear, such as cables, connectors, and antennas. However, when subjected to the high Radio Frequency (RF) power levels found in cellular systems, these devices can generate intermodulation signals at −80 dBm or higher.

PIM signals are generated late in a signal path, so they cannot be filtered out and they may cause more harm than the stronger, but filtered, intermodulation (IM) products from active components. A PIM test is a comprehensive measure of linearity and construction quality. PIM shows up as a set of unwanted signals created by the mixing of two or more strong RF signals in a nonlinear device, such as a loose or corroded connector, or nearby rust. Other names for PIM include the "diode effect" and the "rusty bolt effect."

The rusty bolt effect is a form of radio interference due to interactions of the radio waves with dirty connections or corroded parts. It can result from a variety of different causes such as ferromagnetic conduction metals, or nonlinear microwave absorbers and loads. Corroded materials on antennas, waveguides, or even structural elements, can act as one or more diodes. This gives rise to undesired interference, including the generation of harmonics or intermodulation. Rusty objects that should not be in the signal-path, including antenna structures, can also reradiate radio signals with harmonics and other unwanted signals. As with all out-of-band noise, these spurious emissions can interfere with receivers.

This effect can cause radiated signals out of the desired band, even if the signal into a passive antenna is carefully band-limited. Therefore, it is important for a RAN node to function properly without PIM interference, for example, by locating PIM sources and then eliminating or removing the PIM sources.

SUMMARY

Therefore, one of the problems to be solved by some embodiments of the present disclosure may be how to locate a PIM source along a communication link efficiently and accurately. This problem may be solved or at least alleviated by some embodiments of the present disclosure as follows.

According to a first aspect of the present disclosure, a method for locating a PIM source in a link comprising multiple segments is provided. The method comprises: one of the multiple segments, in which a PIM source is located, is determined at least partially based on delay intervals that are configured or predetermined for the multiple segments and a PIM loopback delay of a PIM component that is related to the PIM source.

In some embodiments, before the step of determining the segment in which the PIM source is located, the method further comprises: whether the PIM component is present in a first signal that is received via the link is determined. Further, the step of determining the segment in which the PIM source is located comprises: the segment in which the PIM source is located is determined in response to determining that the PIM component is present in the first signal.

In some embodiments, the step of determining whether the PIM component is present in the first signal comprises: whether an effective cross-correlation peak is identified for the first signal and a second signal that was previously transmitted via the link and/or another link is determined. Further, the step of determining whether the PIM component is present in the first signal further comprises: it is determined that the PIM component is present in the first signal in response to determining that the effective cross-correlation peak is identified.

In some embodiments, when a first Radio Unit (RU) that receives the first signal via the link is different from a second RU that previously transmitted the second signals via the other link, the method further comprises: the second signal is received from the second RU via Common Public Radio Interface (CPRI) before the step of determining whether the effective cross-correlation peak is identified for the first signal and a second signal.

In some embodiments, the $i^{th}$ delay interval has a lower bound $T_i$ and an upper bound $T_{i+1}$, such that:

$$0 \le T_0 < T_1 < \ldots < T_i < \ldots < T_n < +\infty$$

where n is the number of the multiple segments minus one.

In some embodiments, $T_0$ corresponds to the start point of the link that is located between a Crest Factor Reduction (CFR) module and a Digital Pre-Distortion (DPD) module. In some embodiments, $T_n$ corresponds to a point of an antenna at which a signal is emitted from the antenna to an external space.

In some embodiments, the multiple segments are communicatively coupled in series. In some embodiments, the step of determining the segment in which the PIM source is located comprises: the $i^{th}$ segment is determined as the segment in which the PIM source is located when $$T_i < T_{PIM} \le T_{i+1}$$

where $T_{PIM}$ is a downlink (DL) PIM delay that is determined at least partially based on the PIM loopback delay.

In some embodiments, the DL PIM delay is determined as follows:

$$T_{PIM} = \frac{T_{TDE}}{2} \quad \text{if } T_{TDE} < T_{RU\_LOOP}$$

$$T_{PIM} = T_{RU\_DL} + \frac{T_{TDE} - T_{RU\_LOOP}}{2} \quad \text{if } T_{RU\_LOOP} < T_{TDE} < T_{ANT\_LOOP}$$

$$T_{PIM} = T_{DL} + \frac{T_{TDE} - T_{ANT\_LOOP}}{2} \quad \text{if } T_{ANT\_LOOP} < T_{TDE}$$

where $T_{PIM}$ is the DL PIM delay, $T_{TDE}$ is the PIM loopback delay, $T_{RU\_LOOP}$ is the maximum RU internal loopback delay, $T_{ANT\_LOOP}$ is the maximum loopback delay between the first RU and a corresponding antenna port, $T_{RU\_DL}$ is the maximum RU internal DL delay, and $T_{DL}$ is the maximum DL delay from the first RU to the corresponding antenna port.

In some embodiments, the multiple segments comprise at least one of: a first type of segment for which a distance from a start point of the first type of segment to the location of the PIM source can and will be determined when the PIM source is located in the first type of segment and a second type of segment for which a distance from a start point of the second type of segment to the location of the PIM source cannot or will not be determined when the PIM source is located in the second type of segment.

In some embodiments, the first type of segment comprises at least one of: a cable and air. In some embodiments, the second type of segment comprises at least one of: a part of an RU, a Radio Frequency (RF) port, a device component, an antenna port, and an antenna.

In some embodiments, at least two of the segments have different velocity factors. In some embodiments, when the determined segment, in which the PIM source is located, is a first type of segment, the method further comprises: a distance from a start point of the determined segment to the location of the PIM source is determined at least partially based on a DL PIM delay, a predetermined delay value for the start point, and a velocity factor for the determined segment. Further, the DL PIM delay is determined at least partially based on the PIM loopback delay.

In some embodiments, the distance is determined as follows:

$$D = (T_{PIM} - T_i) \times VF_i \times c$$

where D is the distance from the start point of the determined segment to the location of the PIM source, $T_{PIM}$ is the DL PIM delay, $T_i$ is the lower bound of the delay interval corresponding to the start point of the determined segment, $VF_i$ is the velocity factor for the determined segment, and c is the light speed.

In some embodiments, the multiple segments comprise at least one of: one or more RU parts, an RF port, one or more cables, one or more device components, an antenna port, an antenna, and an external environment. In some embodiments, the method is performed by an RU, and at least one of the delay intervals is configured when the RU is installed in field or predetermined when the RU is produced or manufactured.

According to a second aspect of the present disclosure, a device for locating a PIM source in a link comprising multiple segments is provided. The device comprises: a processor and a memory storing instructions which, when executed by the processor, cause the device to: determine one of the multiple segments, in which a PIM source is located, at least partially based on delay intervals that are configured or predetermined for the multiple segments and a PIM loopback delay of a PIM component that is related to the PIM source.

In some embodiments, the instructions, when executed by the processor, further cause the device to perform the method of the first aspect. In some embodiments, the device is an RU.

According to a third aspect of the present disclosure, a computer program comprising instructions is provided. The instructions, when executed by at least one processor, cause the at least one processor to carry out the method of the first aspect.

According to a fourth aspect of the present disclosure, a carrier containing the computer program of the third aspect is provided. The carrier is one of an electronic signal, optical signal, radio signal, or computer readable storage medium.

With some embodiments of the present disclosure, existing information pieces may be used for locating a PIM source and no additional measurement is required. Further, with some embodiments of the present disclosure, the calculation involved in locating a PIM source is simple and can be implemented by software directly, which may be much more cost efficient than the conventional methods. Further, with some embodiments of the present disclosure, maintainers may locate PIM sources quickly and accurately by using a product internal function without any additional or special tools. Further, with some embodiments of the present disclosure, product competitiveness may be enhanced without additional resources required.

DETAILED DESCRIPTION

Figure 1:
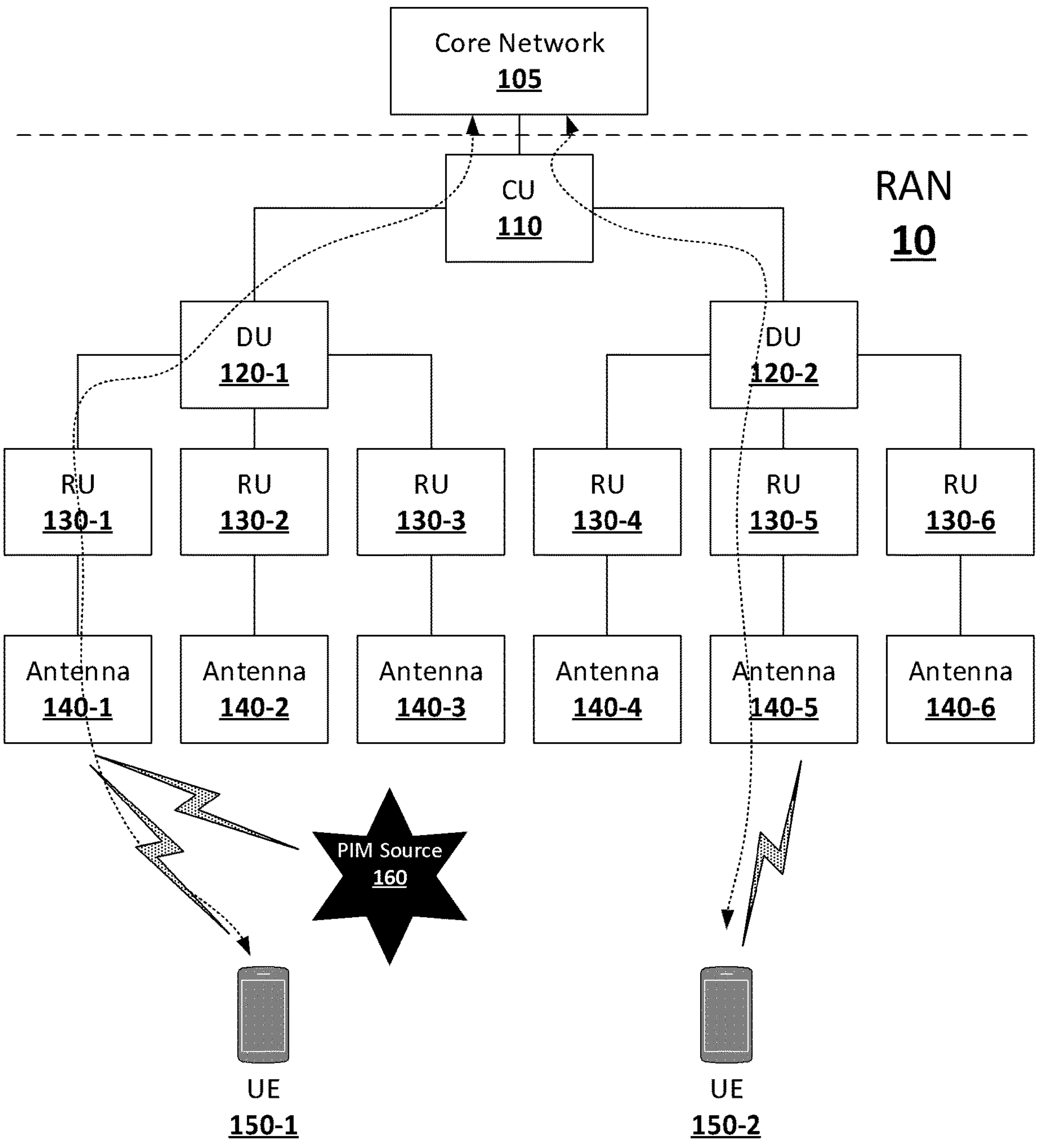
FIG. 1 is a diagram illustrating an exemplary RAN in which PIM locating according to an embodiment of the present disclosure may be applicable.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G NR, the present disclosure is not limited thereto. In fact, as long as PIM source locating is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 4th Generation Long Term Evolution (LTE), LTE-Advance (LTE-A), or 5G NR, etc.

Therefore, one skilled in the arts could readily understand that the terms used herein may also refer to their equivalents in any other infrastructure. For example, the term "User Equipment" or "UE" used herein may refer to a terminal device, a mobile device, a mobile terminal, a mobile station, a user device, a user terminal, a wireless device, a wireless terminal, or any other equivalents. For another example, the term "network node" used herein may refer to a network function, a network element, a RAN node, an OAM node, a testing network function, a transmission reception point (TRP), a base station, a base transceiver station, an access point, a hot spot, a NodeB, an Evolved NodeB (eNB), a gNB, a network element, or any other equivalents. Further, please note that the term "indicator" used herein may refer to a parameter, a coefficient, an attribute, a property, a setting, a configuration, a profile, an identifier, a field, one or more bits/octets, an information element, or any data by which information of interest may be indicated directly or indirectly.

FIG. 1 is a diagram illustrating an exemplary RAN 10 in which PIM locating according to an embodiment of the present disclosure may be applicable. As shown in FIG. 1, the RAN 10 may comprise one or more Central Units (CUs)

110, one or more Distributed Units (DUs) 120-1 and 120-2 (hereinafter, also collectively referred to as DU 120), one or more Radio Units (RUs) 130-1 through 130-6 (hereinafter, also collectively referred to as RU 130), and one or more antennas 140-1 through 140-6 (hereinafter, also collectively referred to as antenna 140). Further, one or more UEs 150-1 and 150-2 (hereinafter, also collectively referred to as UE 150) may wirelessly access the RAN 10 as shown in FIG. 1, such that they can communicate with a Core Network (CN) 105, and then further with other networks, such as the Internet.

As also shown in FIG. 1, the CU 110 may be communicatively coupled to two DUs 120-1 and 120-2, each of which may in turn communicatively coupled to three RUs 130-1, 130-2, 130-3 and three RUs 130-4, 130-5, 130-6, respectively. Further, each of RUs 130 may be communicatively coupled to one of the antennas 140. Although specific numbers of CUs/DUs/RUs/antennas/UEs and specific connections are shown in FIG. 1, the present disclosure is not limited thereto. In some other embodiments, any number of these entities may be present in a RAN, for example, based on the RAN operator's requirements and/or other factors. In some other embodiments, more connections, less connections, different connections may be present between the CUs/DUs/RUs/antennas/UEs.

In some embodiments, the DUs 120 may run the radio link control (RLC) and medium access control (MAC) layers in addition to a higher part of the physical layer (PHY) at a base station (BS) site. It in turn may be controlled by the CU 110. In some embodiments, the CU 110 may run the radio resource control (RRC) protocol, which conducts many functions, including information broadcasting, establishing and releasing connections between the UEs 150 and the RAN 10, and controlling the quality of service. The CU 110 may also work with the packet data convergence protocol (PDCP), which may compress and decompress IP data stream headers and transfers user data, among other technical functions. Further, the CU 110 can remain at the base station site or it can be placed at a more central aggregation site, for example, collocated with the CN 105. The DUs 120, on the other hand, may be kept at a base station that is not at an aggregation or core network location. In some embodiments, the RUs 130 may run a lower part of the PHY layer, and they may control the corresponding antennas to transmit and/or receive signals to and/or from the UEs 150.

As mentioned above, a PIM source located in a link between the RUs 130 (or antennas 140) and the UEs 150 may degrade the quality of the link, thereby reducing throughput of the RAN 10.

Figure 2:
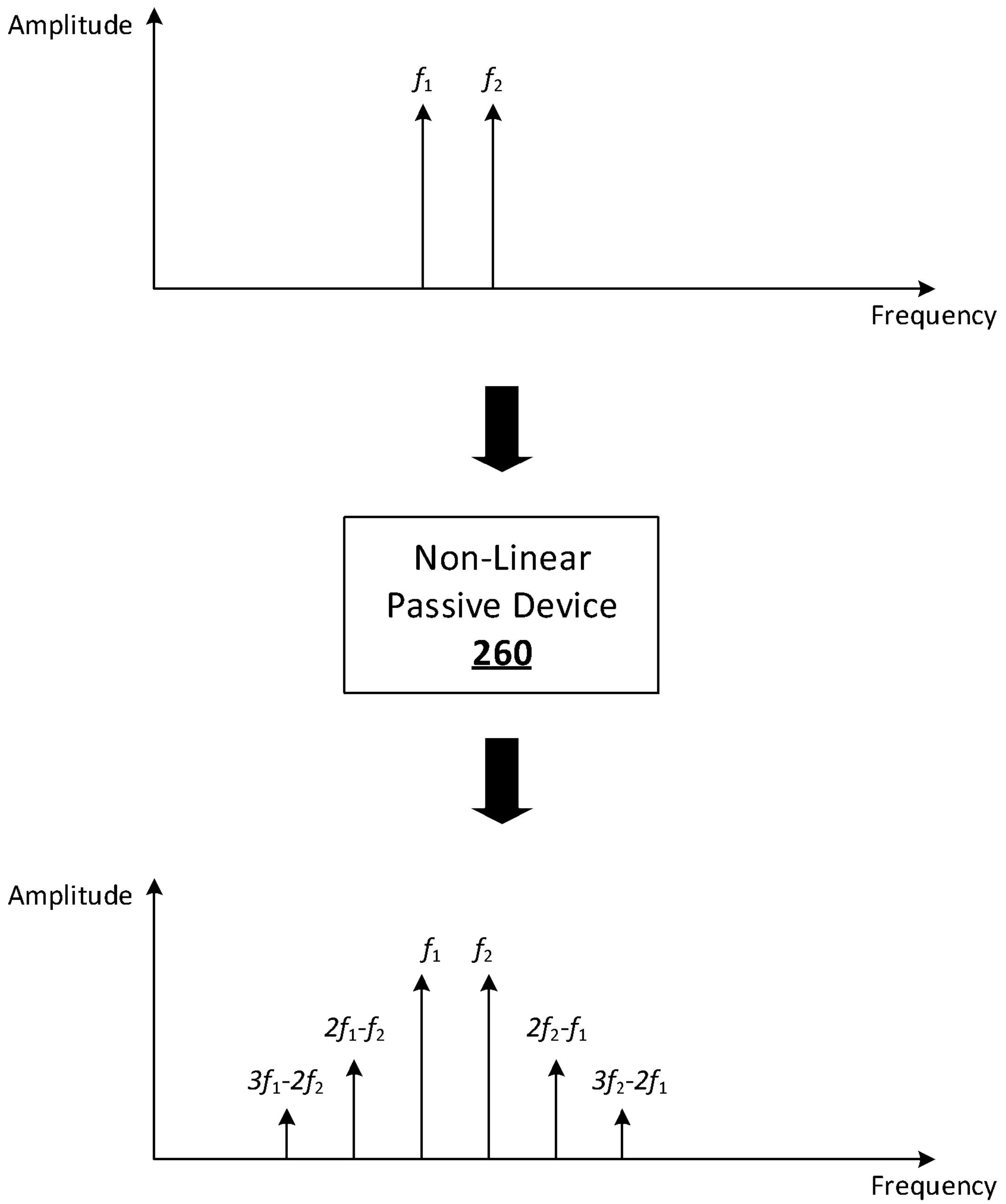
FIG. 2 is a diagram illustrating exemplary PIM products.

FIG. 2 is a diagram illustrating how PIM products are generated in a communication link. As mentioned earlier, PIM is a form of intermodulation distortion that can occur when no active components are present. It may arise from the action of passive components or elements (e.g., a non-linear passive device 260) that have non-linear responses to any signals. PIM can be generated by a variety of components and objects: everything from coaxial connectors to cables, even rusty bolts or any joint where dissimilar metals occur. Even some normally 'linear' components may generate PIM. As also mentioned earlier, PIM can produce interference, and this can sometimes hide the wanted signal.

PIM occurs when two or more signals are present in a passive non-linear device or element. The signals will mix or multiply with each other to generate other signals that are related to the original ones. For example, for two signals that have different frequencies and that are transmitted, for example, by the RU 130-1 via the antenna 140-1 and reflected by a PIM source 160 (e.g., a rusty roof) as shown in FIG. 1, one or more PIM signals may be generated by the PIM source 160 and then detected by the RU 130-1 via the antenna 140-1, as shown in FIG. 1 and FIG. 2.

The nature of PIM is that it occurs in elements that would otherwise be expected to operate in a linear fashion. Typically, any mixing or multiplication in diode components in circuits is not termed PIM as the mixing is generally wanted and the diodes are expected to be in place. Instead, PIM is normally as a result of the spurious generation of non-linearities—typically it may occur in connectors, switches, isolators of the like. Here, oxidation or other effects may cause the generation of a non-linearity.

The PIM products caused by the non-linearity follow exactly the same principles of those of wanted modulation products in a mixer. It is found that the various harmonics of the input frequencies mix together to form products that can remain within the required operational band.

The following expressions can be used to predict PIM frequencies for two carriers with frequencies $f_1$ and $f_2$:

$$n \times f_1 - m \times f_2$$

$$n \times f_2 - m \times f_1$$

where the constants n and m are integers.

When referring to PIM products, the sum of n+m is called the product order, so if m is 2 and n is 1, the result is referred to as a third-order product, as shown in FIG. 2. Typically, the third-order product is the strongest, causing the most harm, followed by the fifth-order products, as also shown in FIG. 2. These PIM products in turn can mix with signals from other sources, producing intermodulation across a wide bandwidth that has the effect of a raised noise floor, some of which will be likely to fall into one of the cellular receive bands.

Typically, PIM may be created via three primary mechanisms:

- Poor installation of the cell site—where dirty, loose, or poor PIM quality components have been used at the cell site—or simply poor configuration of the cell site, for example the way in which the antennas are positioned relative to other antennas or cell sites.
- Physical effects that may be created when the antennas radiate into a PIM reflective material, for example a rusty roof or rusty chains. With densification efforts ongoing, it is increasingly difficult to find "clean" cell sites that are PIM-free. Even tower-mounted antennas commonly suffer from PIM due to the equipment mountings themselves.
- Adjacent RF bands: carrier aggregation is a key requirement of 4.5G (LTE-A) and 5G networks, yet aggregating carriers carries with it the risk that the multiple carriers that are aggregated will create PIM.

As the density of cellular solutions increases, PIM effects will also increase. It is important to note that while PIM is mostly observed with high-power cell sites, it is present even at low power levels, and the effects of PIM will continue to grow across all types of RF systems. This is particularly significant in 5G with the growth of seamless integration of multiple base station technologies to service user needs.

Often PIM has been viewed as an installation problem, and while it is absolutely true that good site installation will minimize PIM, by its very nature it is an ongoing and evolving problem. The industry has worked hard to address PIM at the cell site during installation. However, this does not mean that just because a site is PIM-free today that tomorrow PIM will not occur. Today PIM is more likely to occur due to adjacent bands and/or physical effects in the vicinity of the cell site. For example, if a new RF band is added to an existing cell site, a new physical structure is added within the range of a cell site, or over time the cell site connectors corrode or work loose, this is when PIM will reoccur. The cellular industry is constantly updating and growing the network to meet bandwidth demands, and hence PIM cannot be considered "just" an installation problem.

As mentioned above, PIM is a type of distortion generated by nonlinearity of passive components, such as filters, duplexers, connectors, antennas and so forth at a cell site. Depending on the locations of the components that generate PIM, the PIM can be categorized as internal PIM or external PIM.

For example, PIM generated in filters inside an RU or at a feeder between an RU and an antenna may be referred to as internal PIM. For another example, PIM generated by a metal fence on a roof top of a building may be referred to as external PIM. Traditionally, PIM is a critical problem for customers, and as the rapid growth of LTE and future 5G active antenna system (AAS), radio base stations with multi-band capabilities and multi-antenna further complicate this problem. Some of PIM problems can be solved by internal PIM cancellation function that is relevant to the algorithm compensation. However, for PIM caused by damage of external devices, it still needs to find the specific location to replace or repair the external devices. At present, customers need to spend a lot of testing costs and time to determine the location of PIM source for maintenance work to ensure the normal operation of the network. Therefore, Distance-to-PIM (DTP) is an important feature to identify the location of PIM faults both inside the feed system as well as beyond the antenna. When used correctly, this feature may help technicians quickly and efficiently locate PIM sources at a cell site, resulting in quicker site repairs. In other words, if a product with such a PIM locating feature can help network operators quickly locate the PIM source, then this feature can greatly enhance the competitiveness of the product.

There are several proposed existing solutions of PIM locating for classic base stations.

A way to locate the PIM position is to rent or buy PIM testers from professional testing company, and a rental or service fee is charged according to the frequency band (approximately 25,000 EUR per frequency band). The drawback of this strategy is the huge cost that comes with it. If a project needs at least a few of them to cover multiple frequency band and perform simultaneous PIM tests at multiple sites, that is a huge extra expense for customers. In addition, due to the existence of internal and external PIM, the velocity factor may vary along the link. The velocity factor in the air is much greater than that in the cable, and the test instrument cannot distinguish the difference. As a result, this will lead to the calculation error increases with the increase of the link length, so it is unable to locate PIM source accurately. In some cases, the calculation result can produce 30% error due to ignoring the velocity factor difference of the whole link.

Another solution is to send people for on-site maintenance. Even if the specific location of PIM is unknown, it still can be solved by manually searching the visible damaged parts, by tapping on the connections to observe the PIM changes, or by attempting to replace the potentially damaged devices. The first disadvantage of this solution is that most of the damaged parts are not visible, they may be hidden inside the cable or device. In addition, blind replacement of all devices or cables may cause additional damage, which will bring more additional difficulties to the maintenance work. The second disadvantage is that not all the PIM sources come from cables or devices. If the PIM source comes from the radio unit or external environment, the maintainers will not be able to find out. The third disadvantage is also related to the cost, which requires highly skilled test technicians and extra expenses to send them to carry out on-site maintenance work. In addition, maintainers need to climb the tower and blindly try to replace all the devices. This is also a difficult thing and may bring extra safety risks and device costs.

In summary, the main problems of the existing solutions may involve huge cost, insufficient accuracy, limited capability, and complex operation.

In some embodiments of the present disclosure, a PIM locating solution for base station is proposed. In some embodiments, a PIM locator may be provided, and it may be an internal function of a base station. One of the functionalities of the PIM locator is to achieve rapid locating of a PIM source at least partially based on some information in the system, for example, the delay information of PIM and/or the time alignment data of the whole link. Therefore, the proposed solution can effectively locate the PIM source, for example, by combining the two information.

In addition, the whole link may be composed of one or more types of feeders and external air interfaces, and therefore dividing the whole link into different segments, for example, according to different velocity factors, can improve the accuracy of the results, as the velocity factors of different parts may vary greatly (from 66% (coax with polyethylene dielectric) to 99% (air)). This may include not only the velocity factor difference between different kinds of cables (up to 15% difference), but also the velocity factor difference between cables and air (up to 35% difference).

In practice, a PIM signal or component received by an RU might be generated from a downlink signal from the RU itself and/or another RU. The location of the PIM source may be in the RU or a cable, or the PIM may be generated by a reflection in the external environment. As there are many scenarios, the solution can first identify different scenes of PIM source and then calculate the PIM distance in the corresponding scene. This can improve the accuracy of PIM source detection and facilitate more targeted solutions.

For a link that comprises multiple segments with multiple velocity factors, respectively, dividing the link into different segments by their velocity factors, then determining the segment based on PIM time delay and calculating the distance within the segment will obtain more accurate results than directly calculating the distance from the starting point of the link. In this way, the errors introduced by the distance calculation in the previous segments may be avoided, and the segmentation can help maintainers quickly locate the location of a PIM source without manual measurement. Because human eyes can usually locate things in a short range (e.g., less than 10 meters), but it is difficult to determine the position within tens of meters.

Further, the solution is applicable to general PIM locating in LTE/NR base station that already has PIM Cancellation (PIMC) and/or PIM Detection (PIMD) features. The output format "ID+Distance" may be designed to help the maintainers quickly locate the PIM source without additional measurement work.

In some embodiments, a control method is proposed to set up a PIM location scenario tree, correspondingly cancel a fake detection, and quickly locate a PIM source in all complex scenarios. In some embodiments, a whole link is divided into different segments by their velocity factors, and an intra-segment calculation based on a unique velocity factor may be used to improve accuracy of PIM locating. In this way, PIM detection cost in base station maintenance may be reduced.

With these embodiments, existing information pieces may be utilized without additional measurements. Further, the calculation is simple and can be implemented by software directly. Furthermore, a product may help people to locate a PIM source quickly and accurately by an internal function of the product, and therefore product competitiveness may be improved without additional cost.

Next, some embodiments of the present disclosure will be described in details with reference to FIG. 3 through FIG. 11.

Figure 3:
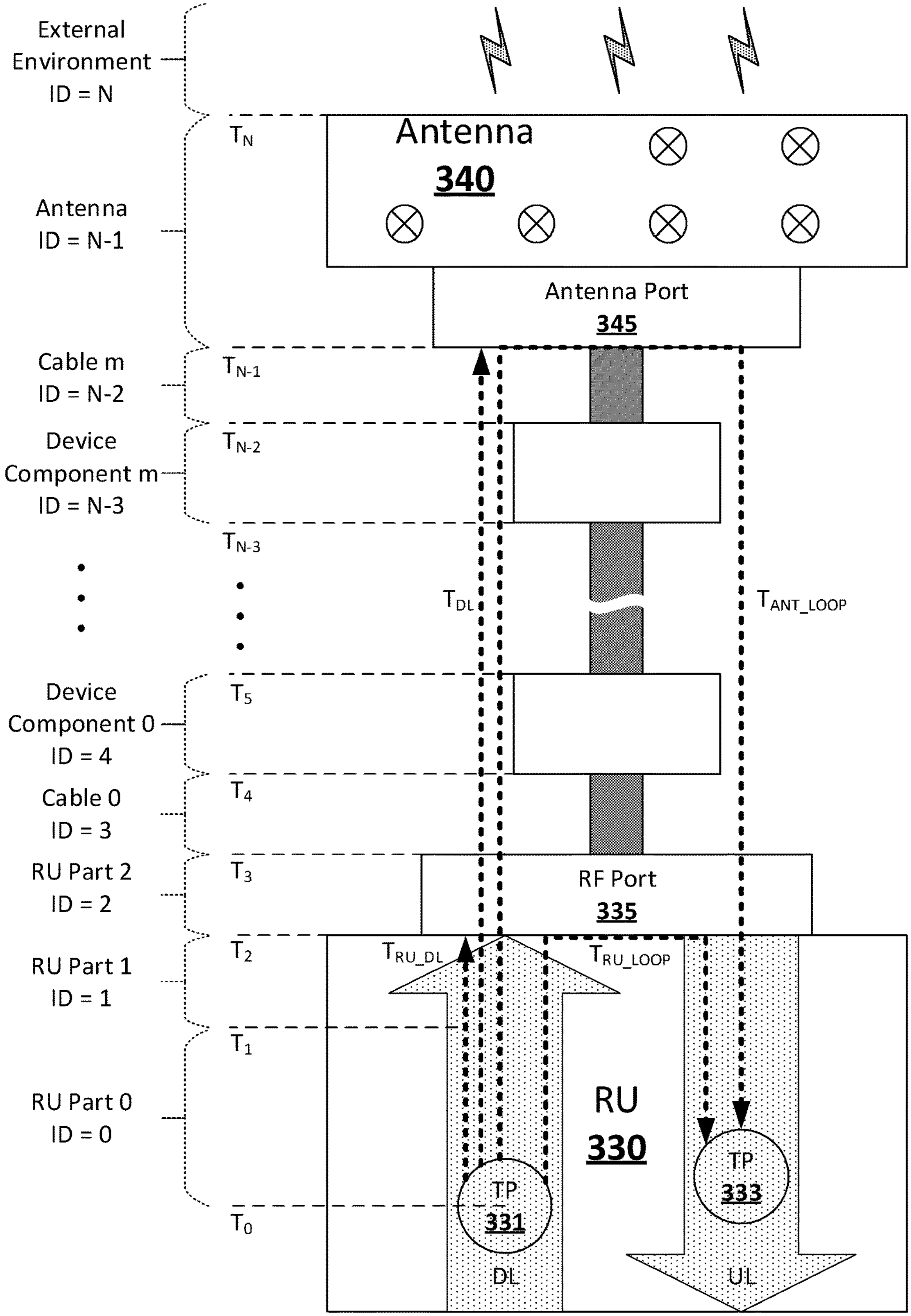
FIG. 3 is a diagram illustrating an exemplary communication link comprising multiple segments with which PIM locating according to an embodiment of the present disclosure may be applicable.

FIG. 3 is a diagram illustrating an exemplary communication link comprising multiple segments with which PIM locating according to an embodiment of the present disclosure may be applicable. As shown in FIG. 3, a whole communication link (hereinafter, "link") between a RAN (e.g., the RAN 10 shown in FIG. 1) and a UE (e.g. the UE 150-1 shown in FIG. 1) may be composed of multiple segments, for example, one or more parts within an RU 330 (e.g., an RU part 0, an RU part 1, and an RF port 335 or an RU part 2), one or more cables (e.g., a cable 0, a cable m), one or more device components (e.g., a device component 0, a device component m), an antenna 340, and/or an external environment (e.g., air). However, the present disclosure is not limited thereto. In some other embodiments, a different number of segments may be present in the link, and/or different elements than those shown in FIG. 3 may be present in the link.

As shown in FIG. 3, these segments may be numbered in a direction from the RU 330 to the antenna 340, starting from 0. In some embodiments, depending on where test data for PIM detection is injected into a signal transmitted over the link, To indicates the start point in downward direction or downlink. In some embodiments, the start point may be set after a CFR module and before a DPD module. However, the present disclosure is not limited thereto.

Further, $T_1$ and $T_2$ are just examples to represent that the RU 330 can be divided into several parts to assist infield maintenance. Typically, outfield maintainers cannot repair the PIM problems inside an RU and the RU with inner PIM problems must be sent to infield for maintenance. In such a case, the use of $T_1$ and $T_2$ may facilitate the infield maintainers in locating PIM sources.

$T_3$ may be time alignment information of the RF port 335. If a DL PIM delay value is greater than $T_3$, it means that the PIM source is not located in the RU 330. As shown in FIG. 3, $T_3$ to $T_4$ indicates the time range of the first section of cable (i.e., the Cable 0), and $T_4$ to $T_5$ indicates the time range for the first component on the cable (i.e., the Device Component 0, such as, a connector, a converter, a dongle, etc.). Similarly, $T_5$ to $T_6$, . . . , $T_{N-2}$ to $T_{N-1}$ may indicate the time ranges for different segments of the link, respectively. $T_N$ may indicate a point where a signal leaves the antenna 340. If the DL PIM delay value is greater than $T_N$, then the PIM source should be located as an external PIM or a PIM located in the external environment.

In some embodiments, $T_0$ to $T_N$ mentioned above may be stored in a database at a PIM locator. In some embodiments, the PIM locator may be a piece of hardware mounted in or with a RAN node (e.g., an RU, a DU, or any other device), a software or firmware that is running at a RAN node (e.g., an RU, a DU, or any other device), and/or a combination thereof. With these $T_x$ data, the link can be divided into multiple segments.

In some embodiments, some of the $T_x$ data may be configured or predetermined during the manufacture or production. For example, $T_0$ through $T_3$ may be configured or predetermined during the manufacture or production of the PIM locator or any hardware comprising or running the PIM locator. In some embodiments, some of the $T_x$ data may be configured when the PIM locator or any hardware comprising or running the PIM locator is installed on the site. For example, $T_4$ and $T_{N-1}$ may be related to the lengths of the cable 0 and the cable m, and therefore $T_4$ and $T_{N-1}$ may be configured to the PIM locator when the cables 0 and m are actually installed on the site. For another example, $T_5$ and $T_{N-2}$ may be related to the delay of the device component 0 and the device component m, and therefore $T_5$ and $T_{N-2}$ may be configured to the PIM locator when the device components 0 and m are actually installed on the site. However, the present disclosure is not limited thereto. For example, $T_0$ through $T_3$ can also be configured when the RU 330 is installed on the site, rather than predetermined during the manufacture, while $T_4$ and $T_{N-1}$ may be predetermined during the manufacture, for example, when the cables have fixed lengths.

A corresponding table may be used to determine in which segment a PIM source is located, and in some cases, to determine a distance from a start point of the segment and the PIM source. For example, a table corresponding to the embodiment shown in FIG. 3 is given below:

TABLE 1

| Judgment | ID No. | Segment name | Time difference | Output message |
|---|---|---|---|---|
| $T_0 < T \le T_1$ | 0 | RU part 0 | \ | ID = 0, Distance = 0 |
| $T_1 < T \le T_2$ | 1 | RU part 1 | \ | ID = 1, Distance = 0 |
| $T_2 < T \le T_3$ | 2 | RU part 2 | \ | ID = 2, Distance = 0 |
| $T_3 < T \le T_4$ | 3 | Cable 0 | $T_D = T_{PIM} - T_3$ | ID = 3, Distance = $T_D * Vf_c * c$ |
| $T_4 < T \le T_5$ | 4 | Component 0 | \ | ID = 4, Distance = 0 |
| . . . | . . . | . . . | . . . | . . . |
| $T_{N-3} < T \le T_{N-2}$ | N-3 | Component m | \ | ID = N-3, Distance = 0 |
| $T_{N-2} < T \le T_{N-1}$ | N-2 | Cable m | $T_D = T_{PIM} - T_{N-2}$ | ID = N-2, Distance = $T_D * Vf_c * c$ |
| $T_{N-1} < T \le T_N$ | N-1 | Antenna | \ | ID = N-1, Distance = 0 |
| $T_N < T$ | N | External | $T_D = T_{PIM} - T_N$ | ID = N, Distance = $T_D * Vf_a * c$ |

In some embodiments, a PIM locator may be operated as follows. Firstly, the PIM locator may obtain a PIM loopback delay $T_{TDE}$ from a PIMC-TDE function in RU side and then calculate a downlink PIM delay $T_{PIM}$. In some embodiments, the $T_{PIM}$ may be calculated according to different conditions. In some embodiments, the $T_{PIM}$ may be calculated as follows:

$$T_{PIM} = \frac{T_{TDE}}{2} \quad \text{if } T_{TDE} < T_{RU\_LOOP}$$

$$T_{PIM} = T_{RU\_DL} + \frac{T_{TDE} - T_{RU\_LOOP}}{2} \quad \text{if } T_{RU\_LOOP} < T_{TDE} < T_{ANT\_LOOP}$$

$$T_{PIM} = T_{DL} + \frac{T_{TDE} - T_{ANT\_LOOP}}{2} \quad \text{if } T_{ANT\_LOOP} < T_{TDE}$$

$T_{PIM}$: Downlink time delay for the PIM source;

$T_{TDE}$: PIMC-TDE time delay that is reported from the PIMC-TDE function;

$T_{RU\_LOOP}$: Maximum RU internal loopback time delay, for example, from the DL test point (TP) 331→the RF Port 335→ the UL TP 333 as shown in FIG. 3;

$T_{ANT\_LOOP}$: Maximum loopback time delay, for example, from the DL TP 331→the antenna Port 345→the UL TP 333 as shown in FIG. 3;

$T_{RU\_DL}$: Maximum RU internal downlink time delay, for example, from the DL TP 331→the RF Port 335 as shown in FIG. 3; and $T_{DL}$: Maximum downlink time delay, for example, from the DL TP 331→the antenna Port 345 as shown in FIG. 3.

Secondly, the PIM locator may judge or otherwise determine in which range $T_{PIM}$ falls according to the downlink-based time database or the table 1 above. At this step, the ID of the determined range may be output as a result.

Thirdly, if it is determined that $T_{PIM}$ falls in a range corresponding to a cable or the external environment (in other words, if it is determined that the PIM source is located in the cable or in the external environment), a further distance calculation may be carried out. To quickly locating the position and reduce the measurement work of maintainers, the distance result may be limited in the segment, so the time difference $T_D$ may be calculated. The way to calculate $T_D$ is to subtract $T_i$ corresponding to the start point of the $i^{th}$ segment, in which the PIM source is located, from $T_{PIM}$:

$$T_D = T_{PIM} - T_i$$

where $T_D$ is the time difference to be calculated, $T_{PIM}$ is the DL PIM delay, and $T_i$ is the time delay value corresponding to the start point of the $i^{th}$ segment.

Finally, the distance can be calculated according to the $T_D$ as follows:

$$D = T_D \times VF_i \times c$$

where D is the distance from the start point of the $i^{th}$ segment to the location of the PIM source, $VF_i$ is the velocity factor for the $i^{th}$ segment, and c is the light speed.

Further, as also shown in Table 1, there are two types of results in the "Output Message" column. For a first type of segment, such as, a cable, external environment (i.e., air), the distance from the start point of the first type of segment to the location of the PIM source can and will be determined when the PIM source is located in the first type of segment. For example, for the cables 0 . . . m, and the external environment, the distances may be calculated as shown in Table 1.

Further, for a second type of segment, the distance from the start point of the second type of segment to the location of the PIM source cannot or will not be determined when the PIM source is located in the second type of segment. For example, for the RU parts 0, 1, 2, the device components 0 . . . m, and the antenna, either the distance cannot be calculated, for example, due to a complex internal structure, or the distance is not needed, for example, when it is more cost-efficient to replace a damaged component with a new one than repairing the damaged component.

In some embodiments, a PIMC-TDE function in the RU 330 may inject test data to its downlink and capture the received uplink data, then calculate cross correlation function of them, to detect whether there is a PIM component in the received UL data. Therefore, only when downlink contains some or all the PIM aggressors and uplink contains the PIM victim, an effective cross-correlation peak can be found. In addition, the RU itself cannot know the frequency band information of other RUs, only DU side can know the frequency band information of all RUs that connected with it as prior information and detect whether PIM exist, so the PIM detection value should come from DU PIMD.

Figure 4:
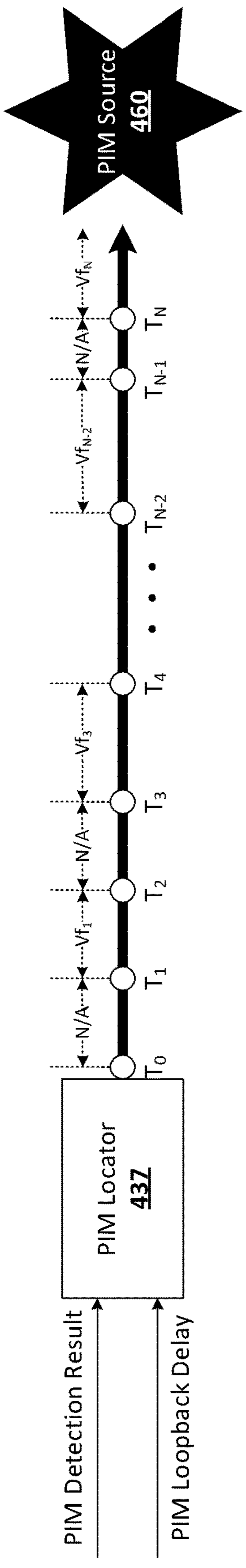
FIG. 4 is a diagram illustrating a simplified model for locating a PIM source according to an embodiment of the present disclosure.

FIG. 4 is a diagram illustrating a simplified model for locating a PIM source according to an embodiment of the present disclosure. As shown in FIG. 4, the whole link may be divided according to the velocity factors. In some embodiments, the node time delay values ($T_0$ through $T_N$) and segment velocity factors ($Vf_0$ through $Vf_N$) may be stored in a database of the PIM locator 437.

As shown in FIG. 4, the PIM locator 437 may have two inputs. One input may be PIM detection result (for example, an output from the DU PIMD function), which can trigger the start of the PIM locator 437 and cancel the fake detection. Another input may be the time delay of the PIM source (for example, $T_{PIM}$ above), which can be used to judge the segment and calculate the distance in the segment under all complex scenarios.

The control method of PIM locator 437 can quickly calculate the location of PIM source according to the information above. When the PIM is detected by the system, the input PIM detection result may trigger the PIM locator 437 to start. Then PIM locator 437 may compare the input PIM time delay with those node delay values in the time database to determine the segment ID of the PIM.

In some embodiments, the $i^{th}$ segment may be determined as the segment in which the PIM source is located when $$T_i < T_{PIM} \le T_{i+1}$$

Further, as also described with FIG. 3 above, a time difference $T_D$ between the PIM source and the segment start point ($T_i$) may be calculated as follows:

$$T_D = T_{PIM} - T_i$$

Finally, the distance can be calculated according to the $T_D$ as follows:

$$D = T_D \times VF_i \times c$$

where D is the distance from the start point of the $i^{th}$ segment to the location of the PIM source, $VF_i$ is the velocity factor for the $i^{th}$ segment, and c is the light speed.

As also mentioned above, after the PIM locator starts, it may also determine whether the calculation of the PIM source is for a same RU situation according to the PIM detection results or not. Only the PIM generated by its own downlink signal is valid result in the same RU situation. For a different RU situation, the DL signal from another RU that causes the PIM shall be received from the other RU, as will be described in details with reference to FIG. 5.

Figure 5:
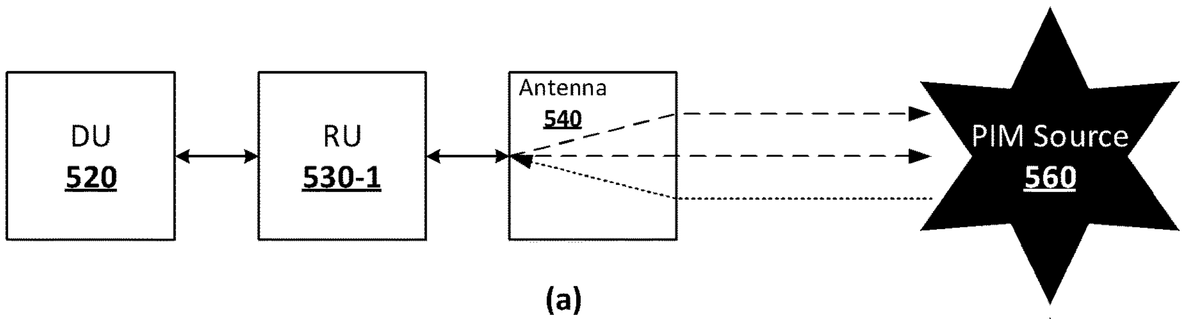
FIG. 5 is a diagram illustrating various exemplary scenarios in which PIM locating is applied according to an embodiment of the present disclosure.
Figure 5:
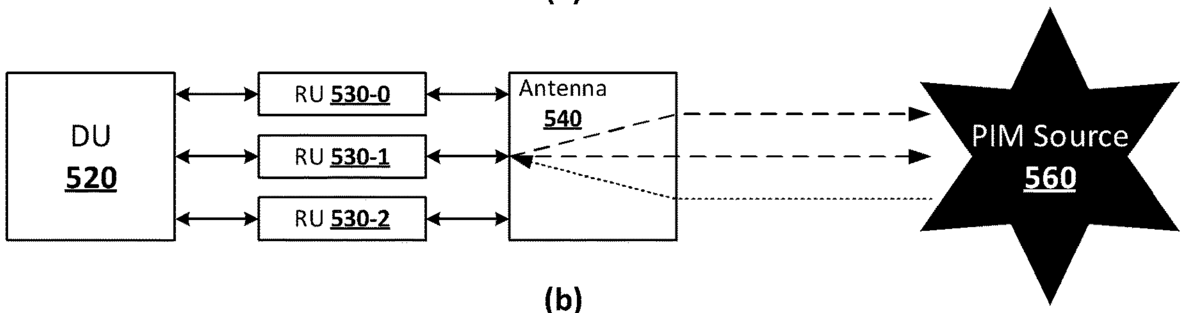
Figure 5:
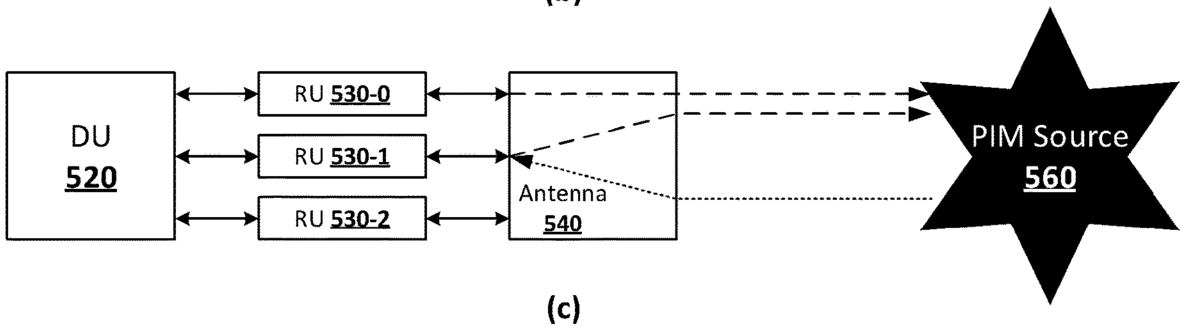
Figure 5:
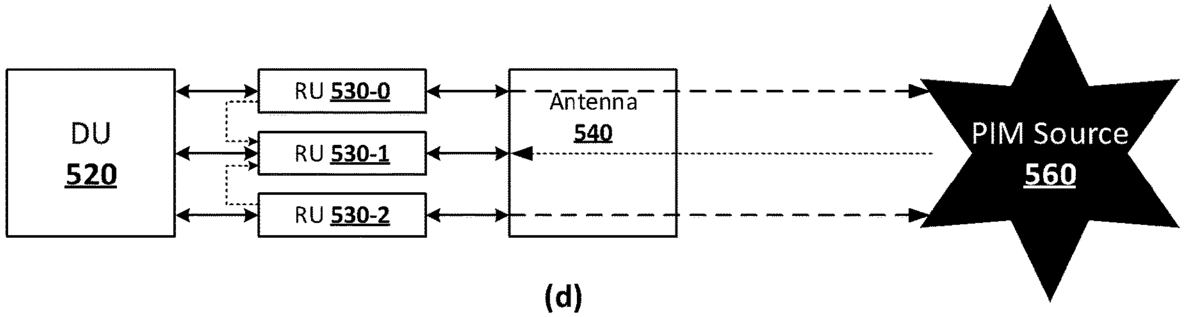
Figure 6A:
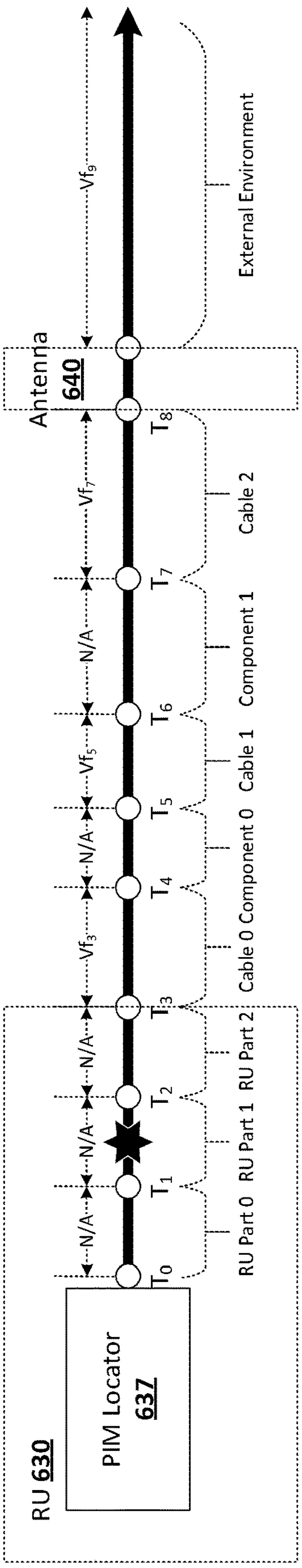
FIG. 6A to FIG. 6D are diagrams illustrating exemplary PIM locating of different PIM sources according to embodiments of the present disclosure.
Figure 6B:
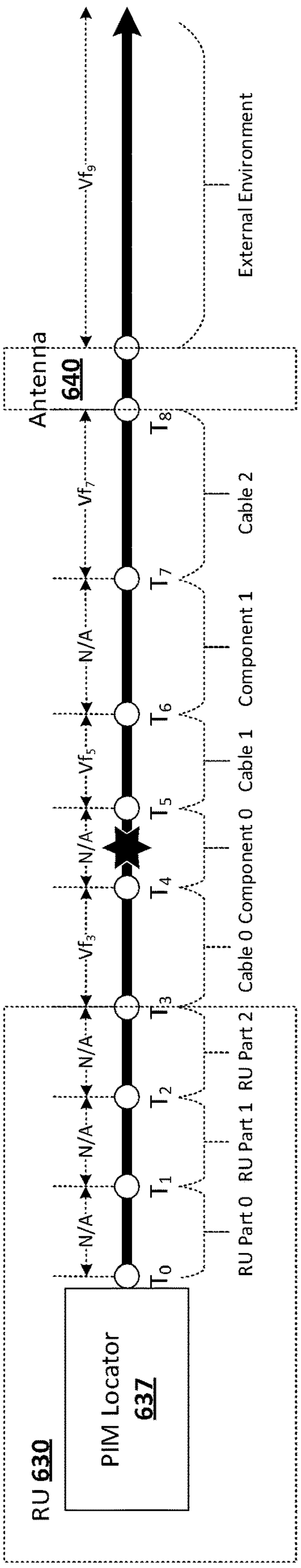
Figure 6C:
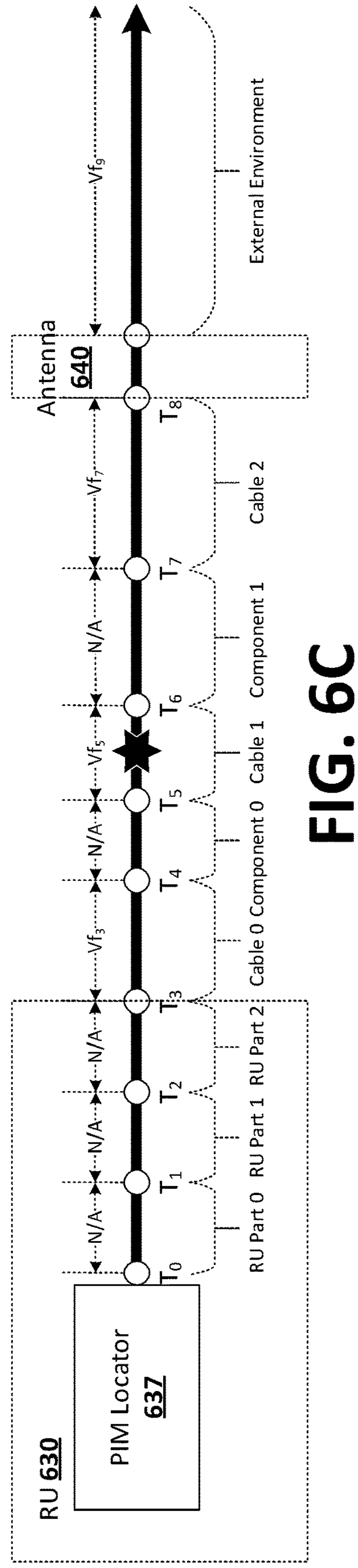
Figure 6D:
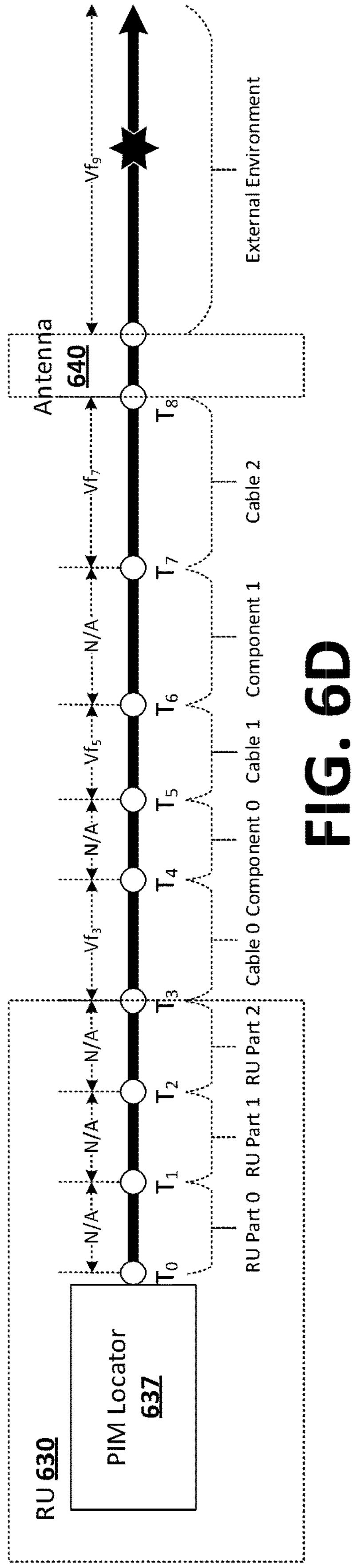

FIG. 5 is a diagram illustrating various exemplary scenarios in which PIM locating is applied according to an embodiment of the present disclosure. To be specific, FIG. 5 shows four typical RU situations. Please note that there are only two PIM aggressors shown in the examples of FIG. 5, and the present disclosure is not limited thereto. In practical, there may be more than two PIM aggressors.

In the first situation (a), there is a single RU. Since there is no PIM aggressor interference from other RU, this judgement result should be "same RU". In the second situation (b), all the PIM aggressors belong to a same RU (e.g., RU 530-1) as that for the PIM victim, and therefore the judgement result can also be "same RU". In the third situation (c), only one PIM aggressor belongs to the RU 530-1 as that for the PIM victim. In such a case, the judgement result may also be "same RU" since a PIM can be detected and/or verified by a single DL signal and received UL signal. However, for the last situation (d), none of the PIM aggressors belongs to the RU 530-1 which acts as the PIM victim. In such a case, the judgement result should be "different RU". In this case, it is necessary to receive the DL signal that contains PIM aggressor from its RU (e.g., the RU 530-0 and/or the RU 530-2) to the PIM victim's RU (e.g., the RU 530-1), for example via a CPRI interface, as illustrated by the dotted arrow between RUs in (d). After that, a similar calculation may be performed to get the final output.

Next, some examples will be described with reference to FIG. 6A through FIG. 6D for better understanding the PIM locating solution. FIG. 6A to FIG. 6D are diagrams illustrating exemplary PIM locating of different PIM sources according to embodiments of the present disclosure. For all these examples, some basic parameters are given as follows.

Basic Parameters:

| $T_{RU\_DL}$ | $T_{DL}$ | $T_{RU\_LOOP}$ | $T_{ANT\_LOOP}$ |
|---|---|---|---|
| 3.1 ns | 124.6 ns | 6.3 ns | 265.3 ns |

Time Database:

| T0 | T1 | T2 | T3 | T4 | T5 | T6 | T7 | T8 |
|---|---|---|---|---|---|---|---|---|
| 0 ns | 1.6 ns | 2.2 ns | 3.1 ns | 23.2 ns | 30.2 ns | 87.4 ns | 94.6 ns | 124.6 ns |

Velocity Factor Database:

| ID = 0 | ID = 1 | ID = 2 | ID = 3 | ID = 4 | ID = 5 | ID = 6 | ID = 7 | ID = 8 |
|---|---|---|---|---|---|---|---|---|
| RU p1<br>Vf0 | RU p2<br>Vf1 | RU p3<br>Vf2 | Cable 0<br>Vf3<br>8.2 | Component 0<br>Vf4 | Cable 1<br>Vf5<br>8.0 | Component 1<br>Vf6 | Cable 2<br>Vf7<br>7.7 | Air<br>Vf8<br>9.9 |

Please note that in the embodiments shown in FIG. 6A through FIG. 6D, the time for signal propagation through the antenna is very short, and therefore it is almost negligible and no segment or time range is provided for the antenna. However, in some other embodiments, the antenna may also be considered as a segment of the link, for example, as shown in FIG. 3.

Example 1 (FIG. 6A): Input PIM Time Delay=$T_{TDE}$=4.3 ns

1. $T_{TDE} < T_{RU\_LOOP} => T_{PIM} = \frac{T_{TDE}}{2} = 2.15$ ns
2. $T_1 < T_{PIM} < T_2 => ID = 1$
3. $T_D = T_{PIM} - T_1 = 2.15 - 1.6 = 0.55$ ns
4. ID=1=>Distance=0
5. Output: ID=1, Distance=0

Explanation: The PIM source is located in the part 1 of the RU.

Example 2 (FIG. 6B): Input PIM Time Delay=$T_{TDE}$=54.7 ns

1. $T_{RU\_LOOP} < T_{TDE} < T_{ANT\_LOOP} => T_{PIM} = T_{RU\_DL} + \frac{T_{TDE} - T_{RU\_LOOP}}{2} = 3.1 + \frac{54.7 - 6.3}{2} = 27.3$ ns
2. $T_4 < T_{PIM} < T_5 => ID = 4$
3. $T_D = T_{PIM} - T_4 = 27.3 - 23.2 = 4.1$ ns
4. ID=4=>Distance=0
5. Output: ID=4, Distance=0

Explanation: The PIM source is located in the device component 0.

Example 3 (FIG. 6C): Input PIM Time Delay=$T_{TDE}$=67.3 ns

1. $T_{RU\_LOOP} < T_{TDE} < T_{ANT\_LOOP} => T_{PIM} = T_{RU\_DL} + \frac{T_{TDE} - T_{RU\_LOOP}}{2} = 3.1 + \frac{67.3 - 6.3}{2} = 33.6$ ns -continued

2. $T_5 < T_{PIM} < T_6 = > ID = 5$

3. $T_D = T_{PIM} - T_5 = 33.6 - 30.2 = 3.4$ ns

4. ID=5=>Distance=$T_D \times VF_5 \times c = 3.4*10^{-9}*8*3*10^8 = 8.16$ m

5. Output: ID=5, Distance=8.16 m

Explanation: The PIM source is located in the cable 1, and the distance is 8.16 m from the start point of the cable 1.

Example 4 (FIG. 6D): Input PIM Time Delay=$T_{TDE}$=296.7 ns

1. $T_{ANT\_LOOP} < T_{TDE} = > T_{PIM} = T_{DL} + \frac{T_{TDE} - T_{ANT\_LOOP}}{2} = 124.6 + \frac{296.7 - 265.3}{2} = 140.3$ ns

2. $T_8 < T_{PIM} = > ID = 8$

3. $T_D = T_{PIM} - T_8 = 140.3 - 124.6 = 15.7$ ns

4. ID=8=>Distance=$T_D \times VF_8 \times c = 15.7*10^{-9}*9.9*3*10^8 \approx 46.6$ m 5. Output: ID=8, Distance≈46.6 m Explanation: The PIM source is located in external environment, and the distance is about 46.6 m from the antenna.

Figure 7:
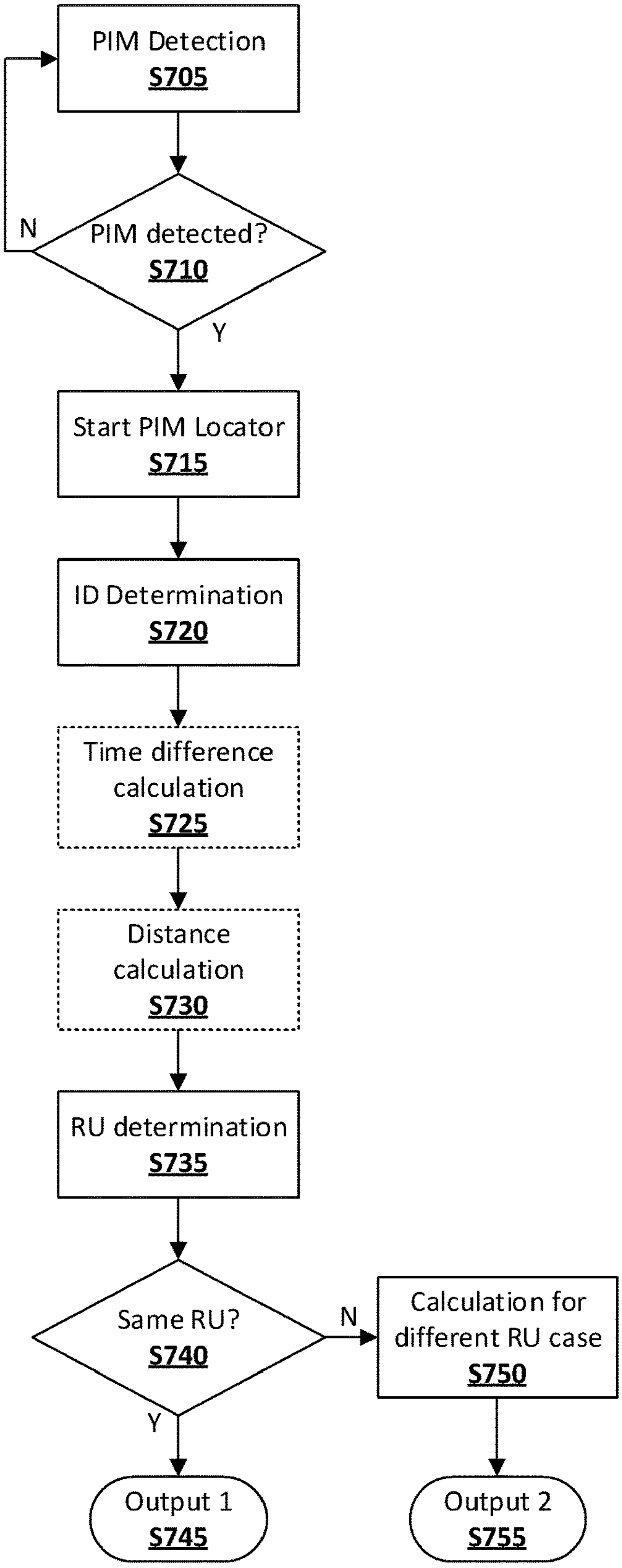
FIG. 7 is a flow chart illustrating an exemplary method for locating a PIM source according to an embodiment of the present disclosure.

FIG. 7 is a flow chart illustrating an exemplary method for locating a PIM source according to an embodiment of the present disclosure. The method may begin with step S705 and S710 where PIMD in a DU may detect whether there is a PIM source repeatedly, for example, by injecting test data into its DL signals and detecting whether there is a correlated peak in its received UL data. The detection may be performed periodically or in response to an event, such as, detection of a high noise level, detection of a low throughput, or a command from higher level.

At step S715, a PIM locator may be triggered and started to work. It may use the PIM time delay and internal time database for ID judgement at step S720 and distance calculation at step S730, for example, as described above with reference to FIG. 3, FIG. 4, and/or FIG. 6A-FIG. 6D. Further, the PIM locator may determine whether it is a same RU or different RU situation according to the PIM detection result at step S735 and S740, for example, as described above with reference to FIG. 5. For single RU, the output 1 may be outputted at step S745. For different RU situation, it is necessary to do an extra calculation at step S750 and obtain the output 2 to output at step S755.

These steps may be implemented as follows.

Step S715: the PIM locator start up step. When the system detects a PIM, the PIM locator may be triggered to start the main process of control method.

Step S720: ID judgement step. The PIM locator may compare the input PIM time delay value with its own time database to determine which segment the PIM belongs to, and then outputs the corresponding ID number.

Step S725 (optional): Time difference calculation step. For the segments for which a distance can and will be calculated, the PIM locator may calculate the time difference value between PIM time delay and the time value of the corresponding segment start point.

Step S730 (optional): Distance calculation step. The PIM locator may calculate the distance of PIM in the segment according to the time difference calculated in the step S725 and the corresponding velocity factor value stored in the PIM locator. After that the distance value may be output as the result.

Step S735: RU judgement step. The PIM locator may determine whether PIM aggressors and victim come from the same RU or not according to the input PIMD information. For same RU situation, output the result of step S735 as the final output (output 1). For different RU situation, the PIM aggressor signals need to be transmitted to the victim's RU for extra calculation at step S750, and then output the result as the final output (output 2) at step S755.

Compared with the traditional method, this process can get more accurate results without manual operation. ID number can help maintainers quickly confirm which segment the PIM source belongs to, and then locate the specific PIM location of the segment according to the distance value. The purpose of RU judgement is that PIM calculation only aims at the PIM generated by its own downlink signal, and the PIM generated by external signal will be regarded as different RU situation, which should be calculated by another method.

Figure 8:
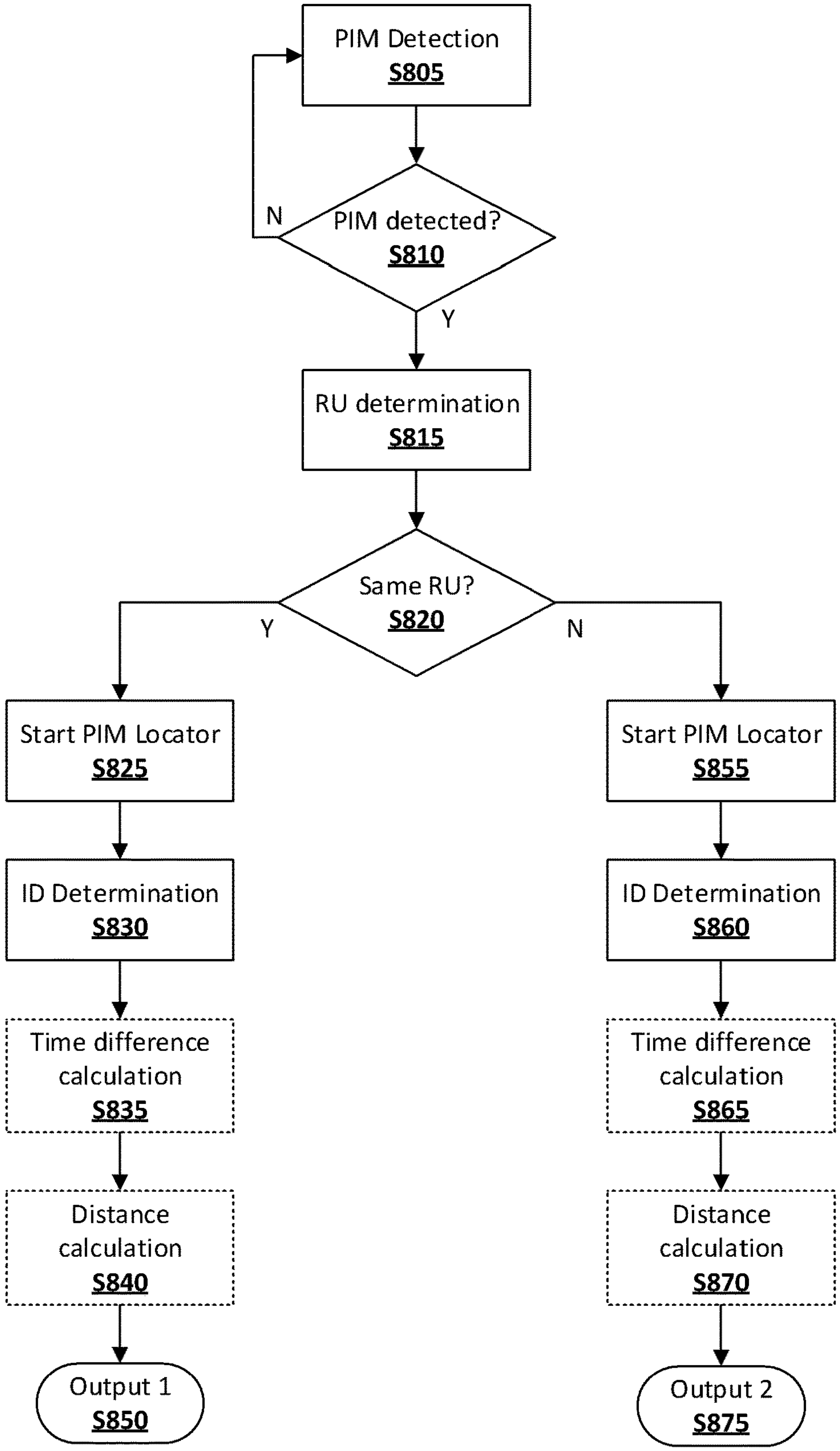
FIG. 8 is a flow chart illustrating another exemplary method for locating a PIM source according to another embodiment of the present disclosure.

FIG. 8 is a flow chart illustrating another exemplary method for locating a PIM source according to another embodiment of the present disclosure. The embodiment shown in FIG. 8 differs from that shown in FIG. 7 in that the RU judgment step is moved to an earlier stage, that is, before the actual determination of the segment ID and/or distance. In this way, if it is "different RU" situation, then no calculation for the same RU situation will be performed, and thus waste of computing resources is avoided.

The steps S805, S810, S815, S820, S825, S830, S835, S840, S850, S855, S860, S865, S870, and S875 in FIG. 8 are substantially similar to the steps S705, S710, S735, S740, S715, S720, S725, S730, S745, S715, S720, S725, S730, and S755 in FIG. 7, respectively, and therefore detailed description thereof may be omitted for clarity and simplicity. However, the present disclosure is not limited to these two embodiments shown in FIG. 7 and FIG. 8. In some other embodiments, a different order of the steps may be applied, and/or more steps, less steps, or different steps may be comprised in the method for locating a PIM source.

Figure 9:
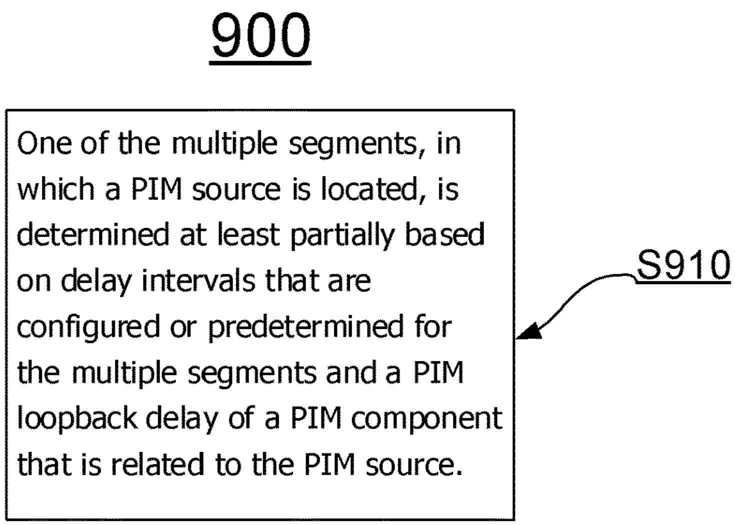
FIG. 9 is a flow chart illustrating yet another exemplary method for locating a PIM source according to yet another embodiment of the present disclosure.

FIG. 9 is a flow chart of an exemplary method 900 at a device for locating a PIM source in a link comprising multiple segments according to an embodiment of the present disclosure. The method 900 may be performed at any device (e.g., the DU 120, the RU 130, the RU 330, the PIM locator 437, the DU 520, the RU 530, the RU 630, the PIM locator 637, or the device 1000). The method 900 may comprise step S910. However, the present disclosure is not limited thereto. In some other embodiments, the method 900 may comprise more steps, different steps, or any combination thereof. Further the steps of the method 900 may be performed in a different order than that described herein when multiple steps are involved. Further, in some embodiments, a step in the method 900 may be split into multiple sub-steps and performed by different entities, and/or multiple steps in the method 900 may be combined into a single step.

The method 900 may begin at step S910 where one of the multiple segments, in which a PIM source is located, may be determined at least partially based on delay intervals that are configured or predetermined for the multiple segments and a PIM loopback delay of a PIM component that is related to the PIM source.

In some embodiments, before the step S910, the method 900 may further comprise: determining whether the PIM component is present in a first signal that is received via the link, wherein the step S910 may comprise: determining the segment in which the PIM source is located in response to determining that the PIM component is present in the first signal. In some embodiments, the step S910 may comprise: determining whether an effective cross-correlation peak is identified for the first signal and a second signal that was previously transmitted via the link and/or another link; and determining that the PIM component is present in the first signal in response to determining that the effective cross-correlation peak is identified. In some embodiments, when a first RU that receives the first signal via the link is different from a second RU that previously transmitted the second signals via the other link, the method 900 may further comprise: receiving the second signal from the second RU via CPRI before the step of determining whether the effective cross-correlation peak is identified for the first signal and a second signal.

In some embodiments, the $i^{th}$ delay interval may have a lower bound $T_i$ and an upper bound $T_{i+1}$, such that:

$$0 \le T_0 < T_1 < \ldots < T_i < \ldots < T_n < +\infty$$

where n may be the number of the multiple segments minus one.

In some embodiments, $T_0$ may correspond to the start point of the link that may be located between a CFR module and a DPD module. In some embodiments, $T_n$ may correspond to a point of an antenna at which a signal may be emitted from the antenna to an external space.

In some embodiments, the multiple segments may be communicatively coupled in series. In some embodiments, the step S910 may comprise: determining the $i^{th}$ segment as the segment in which the PIM source is located when $$T_i < T_{PIM} \le T_{i+1}$$

where $T_{PIM}$ may be a DL PIM delay that is determined at least partially based on the PIM loopback delay.

In some embodiments, the DL PIM delay may be determined as follows:

$$T_{PIM} = \frac{T_{TDE}}{2} \quad \text{if } T_{TDE} < T_{RU\_LOOP}$$

$$T_{PIM} = T_{RU\_DL} + \frac{T_{TDE} - T_{RU\_LOOP}}{2} \quad \text{if } T_{RU\_LOOP} < T_{TDE} < T_{ANT\_LOOP}$$

$$T_{PIM} = T_{DL} + \frac{T_{TDE} - T_{ANT\_LOOP}}{2} \quad \text{if } T_{ANT\_LOOP} < T_{TDE}$$

where $T_{PIM}$ may be the DL PIM delay, $T_{TDE}$ may be the PIM loopback delay, $T_{RU\_LOOP}$ may be the maximum RU internal loopback delay, $T_{ANT\_LOOP}$ may be the maximum loopback delay between the first RU and a corresponding antenna port, $T_{RU\_DL}$ may be the maximum RU internal DL delay, and $T_{DL}$ may be the maximum DL delay from the first RU to the corresponding antenna port.

In some embodiments, the multiple segments may comprise at least one of: a first type of segment for which a distance from a start point of the first type of segment to the location of the PIM source can and will be determined when the PIM source is located in the first type of segment; and a second type of segment for which a distance from a start point of the second type of segment to the location of the PIM source cannot or will not be determined when the PIM source is located in the second type of segment. In some embodiments, the first type of segment may comprise at least one of: a cable; and air. In some embodiments, the second type of segment may comprise at least one of: a part of an RU; an RF port; a device component; an antenna port; and an antenna.

In some embodiments, at least two of the segments may have different velocity factors. In some embodiments, when the determined segment, in which the PIM source is located, is a first type of segment, the method 900 may further comprise: determining a distance from a start point of the determined segment to the location of the PIM source at least partially based on a DL PIM delay, a predetermined delay value for the start point, and a velocity factor for the determined segment, wherein the DL PIM delay may be determined at least partially based on the PIM loopback delay.

In some embodiments, the distance may be determined as follows:

$$D = (T_{PIM} - T_i) \times VF_i \times c$$

where D may be the distance from the start point of the determined segment to the location of the PIM source, $T_{PIM}$ may be the DL PIM delay, $T_i$ may be the lower bound of the delay interval corresponding to the start point of the determined segment, $VF_i$ may be the velocity factor for the determined segment, and c may be the light speed.

In some embodiments, the multiple segments may comprise at least one of: one or more RU parts; an RF port; one or more cables; one or more device components; an antenna port; an antenna; and an external environment. In some embodiments, the method 900 may be performed by an RU, and at least one of the delay intervals may be configured when the RU is installed in field or predetermined when the RU is produced or manufactured.

Figure 10:
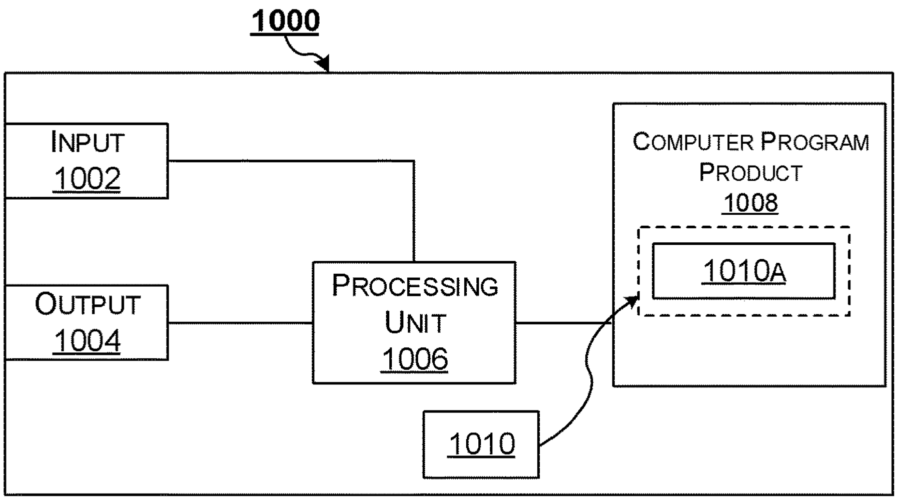
FIG. 10 schematically shows an embodiment of an arrangement which may be used in a device for locating a PIM source according to an embodiment of the present disclosure.

FIG. 10 schematically shows an embodiment of an arrangement 1000 which may be used in a device (e.g., the DU 120, the RU 130, the RU 330, the PIM locator 437, the DU 520, the RU 530, the RU 630, or the PIM locator 637) according to an embodiment of the present disclosure. Comprised in the arrangement 1000 are a processing unit 1006, e.g., with a Digital Signal Processor (DSP) or a Central Processing Unit (CPU). The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity or as separate entities.

Furthermore, the arrangement 1000 may comprise at least one computer program product 1008 in the form of a non-volatile or volatile memory, e.g., an Electrically Erasable Programmable Read-Only Memory (EEPROM), a flash memory and/or a hard drive. The computer program product 1008 comprises a computer program 1010, which comprises code/computer readable instructions, which when executed by the processing unit 1006 in the arrangement 1000 causes the arrangement 1000 and/or the device in which it is comprised to perform the actions, e.g., of the procedure described earlier in conjunction with FIG. 3 to FIG. 9 or any other variant.

The computer program 1010 may be configured as a computer program code structured in computer program modules 1010A. Hence, in an exemplifying embodiment when the arrangement 1000 is used in a device for locating a PIM source, the code in the computer program of the arrangement 1000 includes: a module 1010A for determining one of the multiple segments, in which a PIM source is located, at least partially based on delay intervals that are configured or predetermined for the multiple segments and a PIM loopback delay of a PIM component that is related to the PIM source.

The computer program modules could essentially perform the actions of the flow illustrated in FIG. 3 to FIG. 9, to emulate the device for locating a PIM source. In other words, when the different computer program modules are executed in the processing unit 1006, they may correspond to different modules in the device.

Although the code means in the embodiments disclosed above in conjunction with FIG. 10 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the device.

Figure 11:
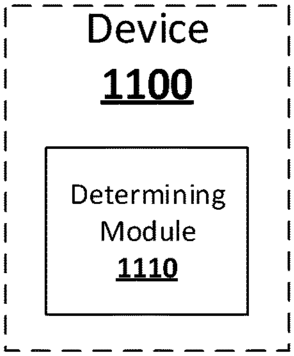
FIG. 11 is a block diagram of an exemplary device for locating a PIM source according to an embodiment of the present disclosure.

Correspondingly to the method 900 as described above, a device for locating a PIM source is provided. FIG. 11 is a block diagram of an exemplary device 1100 according to an embodiment of the present disclosure. The device 1100 may be, e.g., the DU 120, the RU 130, the RU 330, the PIM locator 437, the DU 520, the RU 530, the RU 630, or the PIM locator 637 in some embodiments.

The device 1100 may be configured to perform the method 900 as described above in connection with FIG. 9. As shown in FIG. 11, the device 1100 may comprise a determining module 1110 for determining one of the multiple segments, in which a PIM source is located, at least partially based on delay intervals that are configured or predetermined for the multiple segments and a PIM loopback delay of a PIM component that is related to the PIM source.

The above module 1110 may be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 9. Further, the device 1100 may comprise one or more further modules, each of which may perform any of the steps of the method 900 described with reference to FIG. 9.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method for locating a Passive Intermodulation (PIM) source in a link comprising multiple segments, the method comprising:

determining one of the multiple segments, in which a PIM source is located, at least partially based on delay intervals that are configured or predetermined for the multiple segments and a PIM loopback delay of a PIM component that is related to the PIM source.

2. The method of claim 1, wherein before the step of determining the segment in which the PIM source is located, the method further comprises: determining whether the PIM component is present in a first signal that is received via the link, wherein the step of determining the segment in which the PIM source is located comprises: determining the segment in which the PIM source is located in response to determining that the PIM component is present in the first signal.

3. The method of claim 1, wherein the step of determining whether the PIM component is present in the first signal comprises:

determining whether an effective cross-correlation peak is identified for the first signal and a second signal that was previously transmitted via the link and/or another link; and determining that the PIM component is present in the first signal in response to determining that the effective cross-correlation peak is identified.

4. The method of claim 3, wherein when a first Radio Unit (RU) that receives the first signal via the link is different from a second RU that previously transmitted the second signals via the other link, the method further comprises:

receiving the second signal from the second RU via Common Public Radio Interface (CPRI) before the step of determining whether the effective cross-correlation peak is identified for the first signal and a second signal.

5. The method of claim 1, wherein the $i^{th}$ delay interval has a lower bound $T_i$ and an upper bound $T_{i+1}$, such that:

$$0 \le T_0 < T_1 < \ldots < T_i < \ldots < T_n < +\infty$$

where n is the number of the multiple segments minus one.

6. The method of claim 5, wherein $T_0$ corresponds to the start point of the link that is located between a Crest Factor Reduction (CFR) module and a Digital Pre-Distortion (DPD) module.

7. The method of claim 5, wherein $T_n$ corresponds to a point of an antenna at which a signal is emitted from the antenna to an external space.

8. The method of claim 5, wherein the step of determining the segment in which the PIM source is located comprises:

determining the $i^{th}$ segment as the segment in which the PIM source is located when $$T_i < T_{PIM} \le T_{i+1}$$

where $T_{PIM}$ is a downlink (DL) PIM delay that is determined at least partially based on the PIM loopback delay.

9. The method of claim 8, wherein the DL PIM delay is determined as follows:

$$T_{PIM} = \frac{T_{TDE}}{2} \quad \text{if } T_{TDE} < T_{RU\_LOOP}$$

$$T_{PIM} = T_{RU\_DL} + \frac{T_{TDE} - T_{RU\_LOOP}}{2} \quad \text{if } T_{RU\_LOOP} < T_{TDE} < T_{ANT\_LOOP}$$

$$T_{PIM} = T_{DL} + \frac{T_{TDE} - T_{ANT\_LOOP}}{2} \quad \text{if } T_{ANT\_LOOP} < T_{TDE}$$

where $T_{PIM}$ is the DL PIM delay, $T_{TDE}$ is the PIM loopback delay, $T_{RU\_LOOP}$ is the maximum RU internal loopback delay, $T_{ANT\_LOOP}$ is the maximum loopback delay between the first RU and a corresponding antenna port, $T_{RU\_DL}$ is the maximum RU internal DL delay, and $T_{DL}$ is the maximum DL delay from the first RU to the corresponding antenna port.

10. The method of claim 1, wherein the multiple segments are communicatively coupled in series.

11. The method of 1, wherein the multiple segments comprise at least one of:

a first type of segment for which a distance from a start point of the first type of segment to the location of the PIM source can and will be determined when the PIM source is located in the first type of segment; and a second type of segment for which a distance from a start point of the second type of segment to the location of the PIM source cannot or will not be determined when the PIM source is located in the second type of segment.

12. The method of claim 11, wherein the first type of segment comprises at least one of:

a cable; and air.

13. The method of claim 11, wherein the second type of segment comprises at least one of:

a part of an RU;

a Radio Frequency (RF) port;

a device component;

an antenna port; and an antenna.

14. The method of claim 13, wherein the distance is determined as follows:

$$D = (T_{PIM} - T_i) \times VF_i \times c$$

where D is the distance from the start point of the determined segment to the location of the PIM source, $T_{PIM}$ is the DL PIM delay, $T_i$ is the lower bound of the delay interval corresponding to the start point of the determined segment, $VF_i$ is the velocity factor for the determined segment, and c is the light speed.

15. The method of claim 11, wherein when the determined segment, in which the PIM source is located, is a first type of segment, the method further comprises:

determining a distance from a start point of the determined segment to the location of the PIM source at least partially based on a DL PIM delay, a predetermined delay value for the start point, and a velocity factor for the determined segment, wherein the DL PIM delay is determined at least partially based on the PIM loopback delay.

16. The method of claim 1, wherein at least two of the segments have different velocity factors.

17. The method of claim 1, wherein the multiple segments comprise at least one of:

one or more RU parts;

an RF port;

one or more cables;

one or more device components;

an antenna port;

an antenna; and an external environment.

18. The method of claim 1, wherein the method is performed by an RU, and at least one of the delay intervals is configured when the RU is installed in field or predetermined when the RU is produced or manufactured.

19. A device for locating a PIM source in a link comprising multiple segments, the device comprising:

a processor;

a memory storing instructions which, when executed by the processor, cause the device to:

determine one of the multiple segments, in which a PIM source is located, at least partially based on delay intervals that are configured or predetermined for the multiple segments and a PIM loopback delay of a PIM component that is related to the PIM source.

20. The device of claim 19, wherein the instructions, when executed by the processor, further cause the device to:

determine one of the multiple segments, in which a PIM source is located, at least partially based on delay intervals that are configured or predetermined for the multiple segments and a PIM loopback delay of a PIM component that is related to the PIM source.

* * * * *